United States Patent
Tu (10) Patent No.: US 12,421,351 B2
(45) Date of Patent: Sep. 23, 2025

(54) POLY(ESTER AMIDE)S AND PREPARATION METHOD THEREFOR

(71) Applicant: SOOCHOW UNIVERSITY, Suzhou (CN)

(72) Inventor: Yingfeng Tu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 574 days.

(21) Appl. No.: 17/782,704

(22) PCT Filed: Feb. 7, 2021

(86) PCT No.: PCT/CN2021/075900
§ 371 (c)(1),
(2) Date: Jun. 6, 2022

(87) PCT Pub. No.: WO2021/110182
PCT Pub. Date: Jun. 10, 2021

(65) Prior Publication Data
US 2023/0024746 A1    Jan. 26, 2023

(30) Foreign Application Priority Data
Dec. 6, 2019    (CN) .......................... 201911244454.2

(51) Int. Cl.
C08G 69/44    (2006.01)
C08G 69/28    (2006.01)

(52) U.S. Cl.
CPC .............. *C08G 69/44* (2013.01); *C08G 69/28* (2013.01); *C08G 2230/00* (2013.01)

(58) Field of Classification Search
CPC ..... C08G 2230/00; C08G 69/28; C08G 69/44
See application file for complete search history.

(56) References Cited

U.S. PATENT DOCUMENTS

| | | | |
|---|---|---|---|
| 2,851,443 A * | 9/1958 | Williams | C08G 69/44 264/210.8 |
| 5,883,156 A | 3/1999 | Fukuda et al. | |
| 2017/0035932 A1* | 2/2017 | Sant | C08G 69/44 |

FOREIGN PATENT DOCUMENTS

| | | |
|---|---|---|
| CN | 104892934 A | 9/2015 |
| CN | 109988292 A | 7/2019 |
| CN | 111019126 A | 4/2020 |

OTHER PUBLICATIONS

International Search Report for Parent Application PCT/CN2021/075900 mailed to Applicant on May 12, 2021 (Year: 2021).*
(Continued)

*Primary Examiner* — Randy P Gulakowski
(74) *Attorney, Agent, or Firm* — SZDC Law PC (57) ABSTRACT

Disclosed in the present invention is poly(ester amide)s and method for preparing thermoplastic poly(ester amide)s therefor. The poly(ester amide)s are prepared using diamine or alkamine as initiator, with diacid and dialcohol-based cyclicester as the monomer, in the catalyst, and by cascade polycondensation-coupling ring-opening polymerization. The obtained poly(ester amide)s have good mechanical properties, solvent resistance and thermal stability. It effectively solves the deficiencies in the current poly(ester amide)s, such as low crystallization temperature and poor heat resistance of polyester parts, and low modulus and rigidity from polyamides part. For aliphatic poly(ester amide)s, they are biodegradable. By means of altering such factors as the ratio of ester bonds and amide bonds and polymer molecular weight and distribution, the performance of the poly(ester amide)s material can be adjusted, causing the invention to have broad application in such fields as engineering plastics, thermoplastic elastomers, tissue engineering, and controlled release.

4 Claims, 8 Drawing Sheets

(56) References Cited

OTHER PUBLICATIONS

Wu et al "Study on PET-PA66 Copolymer", Chinese Journal of Polymer Science, vol. 10; No. 4; pp. 356-360. (Year: 1992).*
Daniel J. Brunelle et al "Semicrystalline Polymers via Ring-Opening Polymerization: Preparation and Polymerization of Alkylene Phthalate Cyclic Oligomers", Macromolecules 1998, 31, 4782-4790 (Year: 1998).*
Ana Pascual et al "Organocatalyzed Synthesis of Aliphatic Polyesters from Ethylene Brassylate: A Cheap and Renewable Macrolactone", ACS Maco Lett. 2014,3,849-853. (Year: 2014).*
Xiang Zhu et al "PROP: an in situ cascade polymerization method for the facile synthesis of polyesters", Polym. Chem., 2017, 8, 1953 (Year: 2017).*
Jiaqing Zuo et al "Thermoplastic polyester amides derived from oleic acid", Polymer 52(2022),pp. 4503-4516. (Year: 2011).*
Li HongWei et al"Synthesis of polyester-amides by chain extension", Journal of Beijing University of Chemical Technology, 2011, 38(4): 89-93 (Year: 2011).*
Gregory I. Peterson et al "Cascade polymerizations: recent developments in the formation of polymer repeat units by cascade reactions" Chem. Sci., 2020, 11, 4843-4854 (Year: 2020).*
Min Lu et al "Synthesis of Cyclic Oligo(ethylene adipate)s and Their Melt Polymerization to Poly(ethylene adipate)", Chinese Journal of Polymer Science vol. 35, No. 9, (2017), pp. 1051-1060. (Year: 2017).*
Geng Hua et al "Exploiting Ring-Opening Aminolysis-Condensation as a Polymerization Pathway to Structurally Diverse Biobased Polyamides", Biomacromolecules 2018, 19, 1573-1581 (Year: 2018).*
Protonis et al "Biobased Polyamide Thermosets: From a Facile One-Step Synthesis to Strong and Flexible Materials", Macromolecules 2019, 52, 6181-6191 (Year: 2019).*
Lakshminarayanan Ragupathya et al., "Enzyme-catalyzed polymerizations at higher temperatures: Synthetic methods to produce polyamides and new poly(amide-co-ester)s" Journal of Molecular Catalysis B: Enzymatic 76 (2012) 94-105 (Dec. 8, 2011).
Ying-feng Tu, "Cascade Polymerization" Acta Polymerica Sinica, vol. 50, No. 11, pp. 1146-1155 (Nov. 30, 2019).
Li HongWei et al., "Synthesis of polyester-amides by chain extension" Journal of Beijing University of Chemical Technology (Natural Science), vol. 38, No. 4, pp. 89-93 (Nov. 11, 2011).
Min Lu et al., "Synthesis of Cyclic Oligo(ethylene adipate)s and Their Melt Polymerization to Poly(ethylene adipate)" Chinese Journal of Polymer Science vol. 35, No. 9, (2017), 1051-1060 (Sep. 22, 2017).
Geng Hua et al., "Exploiting Ring-Opening Aminolysis-Condensation as a Polymerization Pathway to Structurally Diverse Biobased Polyamides" vol. 19, pp. 1583-1581 (Mar. 27, 2018).

* cited by examiner

POLY(ESTER AMIDE)S AND PREPARATION METHOD THEREFOR

This application is the National Stage Application of PCT/CN2021/075900, filed on Feb. 7, 2021, which claims priority to Chinese Patent Application No. 201911244454.2, filed on Dec. 6, 2019, which is incorporated by reference for all purposes as if fully set forth herein.

TECHNICAL FIELD

The invention relates to a method for preparing thermoplastic poly(ester amide)s, which belongs to the field of polymer material preparation.

BACKGROUND TECHNIQUE

The common synthetic methods of poly(ester amide)s are condensation polymerization and ring-opening polymerization. Among them, the condensation polymerization method has many side reactions, and it is necessary to strictly control the stoichiometric ratio, increase the reaction temperature, extend the reaction time, and increase the vacuum to obtain high molecular weight polymers. Compared with the condensation polymerization method, the ring-opening polymerization method has the advantages of fast reaction speed, mild reaction conditions, and high polymer molecular weight. However, there are fewer types of monomers that can undergo ring-opening polymerization, generally ABAB-type cyclic monomers, which require several complex synthesis steps to obtain the monomers, which increases the complexity of the method and increases the cost.

At present, there are few reports on the preparation of high-performance poly(ester amide)s by green and economical synthetic methods. In order to adapt to the pace of social development, it is urgent to develop a universal method to prepare environmentally friendly poly(ester amide)s polymer materials to meet the needs of more application fields.

Technical Problem

The object of the present invention is to provide a method for preparing poly(ester amide)s which are synthesized by cascade polycondensation-coupling ring-opening polymerization (PROP) of diamines/aminoalcohols with cyclicesters. Diamines, such as 1,6-hexanediamine, 1,8-octanediamine, 1,10-decanediamine, 1,12-diaminododecane, 1,3-cyclohexanedimethylamine, or 1,4-xylylenediamine; aminoalcohols, such as 6-amino-1-hexanol, isobutanolamine are those containing $C_6$~$C_{12}$ carbon atoms and so on, which are as initiators. Diacid and dialcohol-based cyclicester such as aliphatic macrocycles lactone ethylene brassylate, cyclic oligoethylene adipate or aromatic macrolide cyclic oligobutylene terephthalate are monomers. By adopting the cascade polycondensation-coupling ring-opening polymerization, the ring-opening polymerization reaction and the condensation polymerization reaction are cascaded in the same system, thereby synthesizing the poly(ester amide)s in one step. The poly(ester amide)s copolymer of the present invention has both good biocompatibility and biodegradability, excellent mechanical properties, solvent resistance and thermal stability; by changing the ratio of ester bonds and amide bonds, polymer molecular weight and distribution Factors such as those can control the properties of poly(ester amide)s materials, making them widely used in engineering plastics, thermoplastic elastomers, tissue engineering, and controlled release.

TECHNICAL SOLUTIONS

In order to achieve the above-mentioned object of the invention, the technical solution adopted by the present invention is: poly(ester amide)s of the following chemical formula:

$R_1$ is one of —$(CH_2)_n$NH—, —$(CH_2)_6$O—, —$C(CH_3)_2CH_2O$—;

Or $R_1$ is

$R_2$ is —$(CH_2)_m$ or n is from 4 to 16; m is from 4 to 11; t is from 2 to 4; x is from 10 to 250; y is from 2 to 200.

In embodiments, $R_1$ is —$(CH_2)_6$NH—, —$(CH_2)_8$NH—, —$(CH_2)_{10}$NH—, —$(CH_2)_{12}$NH—, —$(CH_2)_6$O—, or —$C(CH_3)_2CH_2O$—;

Or $R_1$ is $R_2$ is —$(CH_2)_{11}$—, —$(CH_2)_4$—, or

A method of preparing poly(ester amide)s includes: with diamines or aminoalcohols as initiators, diacid and dialcohol-based cyclicesters as monomers, in the presence of the catalyst, preparing poly(ester amide)s by cascade polycondensation-coupling ring-opening polymerization.

This invention discloses application of n-butyl titanate or isobutyl titanate as catalyst in catalyzing diamine or aminoalcohol as initiator to initiate the cascade polycondensation-coupling ring-opening polymerization of dialcohol-based cyclicester is aliphatic macrolide to prepare poly(ester amide)s.

In the present invention, the diamine is one of 1,6-hexanediamine, 1,8-octanediamine, 1,10-decanediamine, 1,12-diaminododecane, 1,3-cyclohexane-dimethylamine, or 1,4-xylylenediamine; aminoalcohol is 6-amino-1-hexanol or isobutanolamine.

In the present invention, the diacid and dialcohol-based cyclicesters and cyclic oligoesters or aromatic macrolide; preferably, aliphatic macrolide is ethylene brassylate(13 alkyl acid ethylene ester ring) or cyclic oligomeric ethylene adipate, and aromatic macrolide is cyclic oligobutylene terephthalate.

In the present invention, the catalyst is titanate compound, preferably, n-butyl titanate or isobutyl titanate.

In the present invention, a molar ratio of the monomer to the initiator is 2:100; wherein a molar ratio of the catalyst is 0.03% to 1% of the total mass of monomer and initiator.

In the present invention, the reaction is conducted at 200 to 280° C., for 10 to 240 hours. the reaction is conducted under the nitrogen atmosphere or vacuum condition; after the reaction, the polymerization product is directly obtained without post-treatment.

The preparation method of the poly(ester amide)s of the present invention can be specifically as follows: at room temperature, added the diamine or aminoalcohol, diacid and dialcohol-based cyclicesters and cyclic oligoesters into the reaction device, vent nitrogen, perform mechanical stirring, and heated at 200 to 280° C., then add catalyst, continue to ventilate nitrogen or vacuum, and polymerize for 30 to 240 minutes to obtain poly(ester amide)s. Or at room temperature, added diamine or aminoalcohol, diacid and dialcohol-based cyclicesters and cyclic oligoesters into the reaction device, then add catalyst, perform mechanical stirring, and heated at 200 to 280° C., under the ventilate nitrogen or vacuum, and the poly(ester amide)s can be obtained in 10 to 120 minutes.

In the present invention, the polymerization mechanism is a ring-opening-condensation cascade polymerization process, that is, the diamine or aminoalcohol as initiator reacts to the ethylene brassylate, cyclic oligomeric ethylene adipate, or cyclic oligobutylene terephthalate to initiate cascade polycondensation-coupling ring-opening polymerization to obtain poly(ester amide)s with hydroxyl end groups. Poly (ester amide)s are not only continue to initiate the ring-opening polymerization of macrolides, but also condensation polymerization with each other to generate higher molecular weights, the reaction product is poly(ester amide)s, without purification and separation.

The preparation method of the poly(ester amide)s of the present invention effectively solves the problem that the prior art is difficult to adjust the properties (molecular weight, structure and performance) of the poly(ester amide)s in the large range, and broadens the application range of the poly(ester amide)s.

Beneficial Effects

With the application of the above technical solutions, the present invention has the following advantages compared with the prior art:

The invention relates to the preparation of thermoplastic poly(ester amide)s, which are synthesized by cascade polycondensation-coupling ring-opening polymerization. The polymerization method has the advantages of simple reaction steps, high molecular weight and controllable, no need for post-treatment, and large-scale synthesis.

With 1,6-hexanediamine, 1,8-octanediamine, 1,10-decanediamine, 1,12-diaminododecane, 1,3-cyclohexanedimethylamine, 1,4-xylylenediamine, 6-amino-1-hexanol or isobutanolamine as initiators; ethylene brassylate, cyclic oligomeric ethylene adipate, cyclic oligobutylene terephthalate as monomers, which can be purchased in large quantities and the price is very cheap. Therefore, the cost of the synthesized polyester amide is very low. It effectively solves the deficiencies in the current poly(ester amide)s, such as low crystallization temperature and poor heat resistance of polyester parts, and low modulus and rigidity from polyamides part. For aliphatic poly(ester amide)s, they are biodegradable.

The poly(ester amide)s synthesized by this method has excellent mechanical properties, solvent resistance and thermal stability. The introduction of polyamide improves the solvent resistance and heat resistance of polyester, and has great application value.

EXAMPLES OF THE INVENTION

The following further describes the present invention with reference to the examples: with diamines or aminoalcohols as initiators, diacid and dialcohol-based cyclicesters as monomers, in the presence of the catalyst, poly(ester amide) s are prepared by cascade polycondensation-coupling ring-opening polymerization. It effectively solves the deficiencies in the current poly(ester amide) s, such as low crystallization temperature and poor heat resistance of polyester parts, and low modulus and rigidity from polyamides part.

Figure 1:
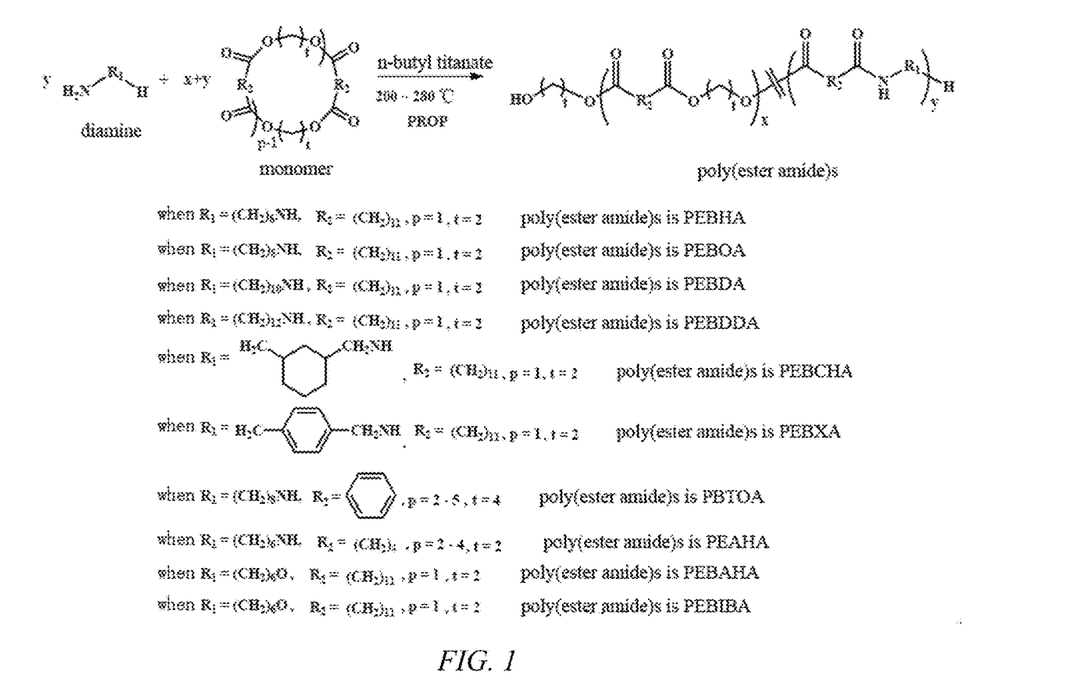
FIG. 1 is diagram of Synthesis of poly(ester amide)s.

As shown in FIG. 1, the present invention obtains a series of aliphatic poly(ester amide)s and semi-aromatic poly(ester amide)s through a cascade polycondensation-coupling ring-opening polymerization method.

Example 1

Aliphatic poly(ester amide) poly(ethylene brassylate-co-1,6-hexa-methylene brassylamide) (PEBHA) by cascade polycondensation-coupling ring-opening polymerization of 1,6-hexanediamine and ethylene brassylate under nitrogen condition.

Figure 2:
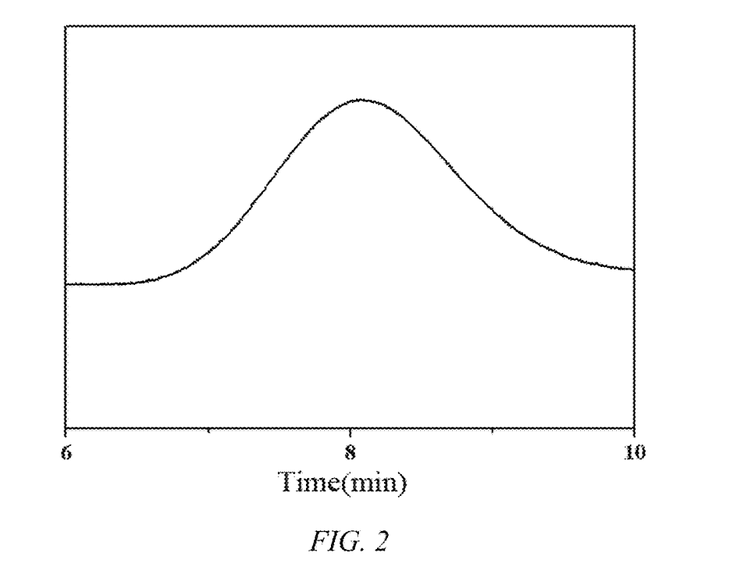
FIG. 2 is shown the size exclusion chromatography curve for PEBHA in Example 1 (solvent:tetrahydrofuran concentration: 1.00 mg/ml)

Ethylene brassylate (9.00 g), 1,6-hexanediamine (1.00 g) and n-butyl titanate (20.0 µL) were added into a 250 ml single-necked flask at room temperature. The flask was heated to 240° C. with mechanical stirring. The polymerization was carried under vacuum for 60 minutes to finally generate the corresponding polymer PEBHA. The size exclusion chromatography curve for PEBHA is shown in FIG. 2, and the measured number-average molecular weight is 36.1 kg/mol, which proves the successful synthesis of the target product.

Example 2

Aliphatic poly(ester amide) poly(ethylene brassylate-co-1,8-octamethylene brassylamide) (PEBOA-1) by cascade polycondensation-coupling ring-opening polymerization of 1,8-octanediamine and ethylene brassylate under nitrogen condition.

Figure 3:
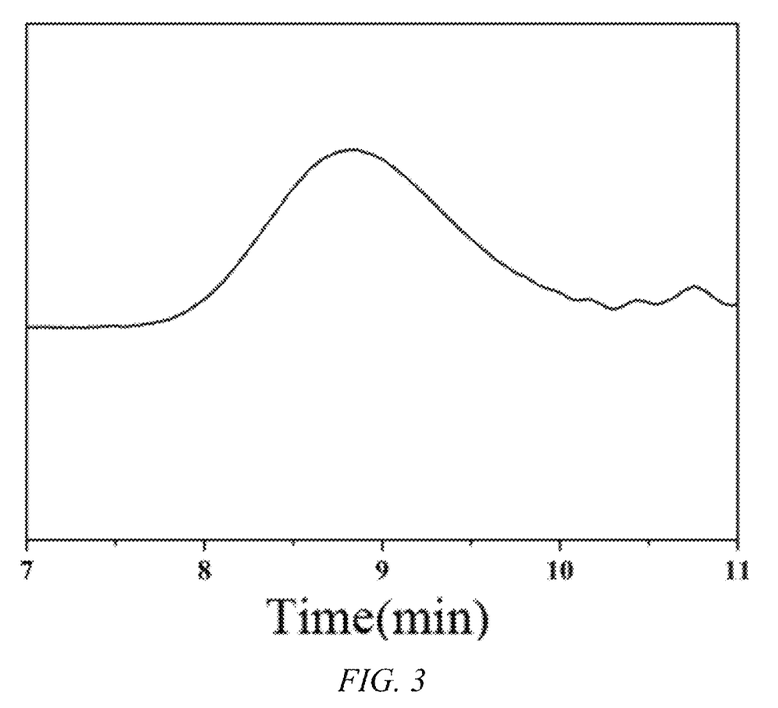
FIG. 3 is shown the size exclusion chromatography curve for PEBOA-1 in Example 2 (solvent:tetrahydrofuran concentration: 1.00 mg/ml)

1,8-Octanediamine (0.50 g) and ethylene brassylate (9.50 g) were added into a 100 ml three-necked flask with nitrogen inlet. The flask was heated to 220° C. with mechanical stirring, and n-butyl titanate (20.0 µL) was added. The cascade polycondensation-coupling ring-opening polymerization was carried out under nitrogen for 60 minutes to generate the corresponding polymer PEBOA-1. The size exclusion chromatography curve for PEBOA-1 is shown in FIG. 3, and the measured number-average molecular weight is 8.30 kg/mol, which proves the successful synthesis of the target product.

Example 3

Aliphatic poly(ester amide) poly(ethylene brassylate-co-1,8-octamethylene brassylamide) (PEBOA-2) by cascade polycondensation-coupling ring-opening polymerization of 1,8-octanediamine and ethylene brassylate under vacuum conditions.

1,8-Octanediamine (7.50 g), ethylene brassylate (22.5 g) and n-butyl titanate (60.0 µl) were added into a 250 ml single-necked flask. The mixture was heated to 240° C. under mechanical stirring, and polymerized under vacuum for 60 minutes to finally generate the corresponding polymer PEBOA-2.

Figure 4:
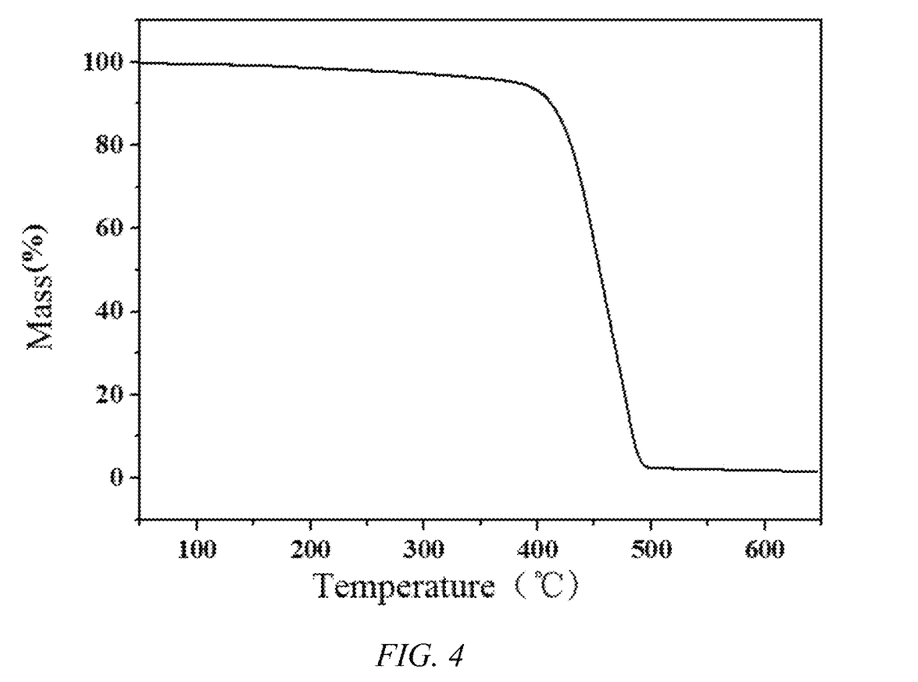
FIG. 4 is shown the thermogravimetric curve of PEBOA-2 in Example 3(heating rate: 10° C. per minute, atmosphere: nitrogen)

The thermogravimetric curve of PEBOA-2 is shown in FIG. 4. The 5% weight loss thermal decomposition temperature of the polymer is 382° C., indicating that the aliphatic poly(ester amide) has good thermal stability.

Figure 5:
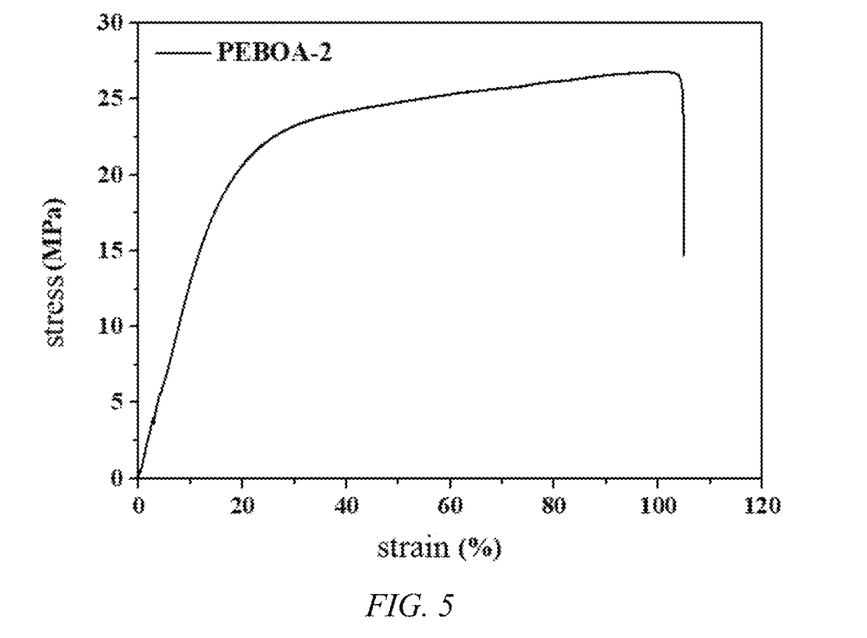
FIG. 5 is shown the stress-strain curve of PEBOA-2 in Example 3(stretching rate: 10 mm per minute, temperature: 25.7° C., humidity: 79.0%)

The stress-strain curve of PEBOA-2 is shown in FIG. 5. The Young's modulus of the polymer is 145 MPa, with the strength of 26.8 MPa, and the elongation at break of 101%, indicating that the polymer has good mechanical properties.

Example 4

Aliphatic poly(ester amide) (PEBOA-3) by cascade polycondensation-coupling ring-opening polymerization of 1,8-octanediamine and ethylene brassylate under vacuum conditions.

1,8-Octanediamine (3.00 g), ethylene brassylate (27.0 g) and n-butyl titanate (60.0 µl) were added into a 250 ml single-necked flask. The mixture was heated to 240° C. under mechanical stirring, and polymerized under vacuum for 60 minutes to finally generate the corresponding polymer PEBOA-3.

Figure 6:
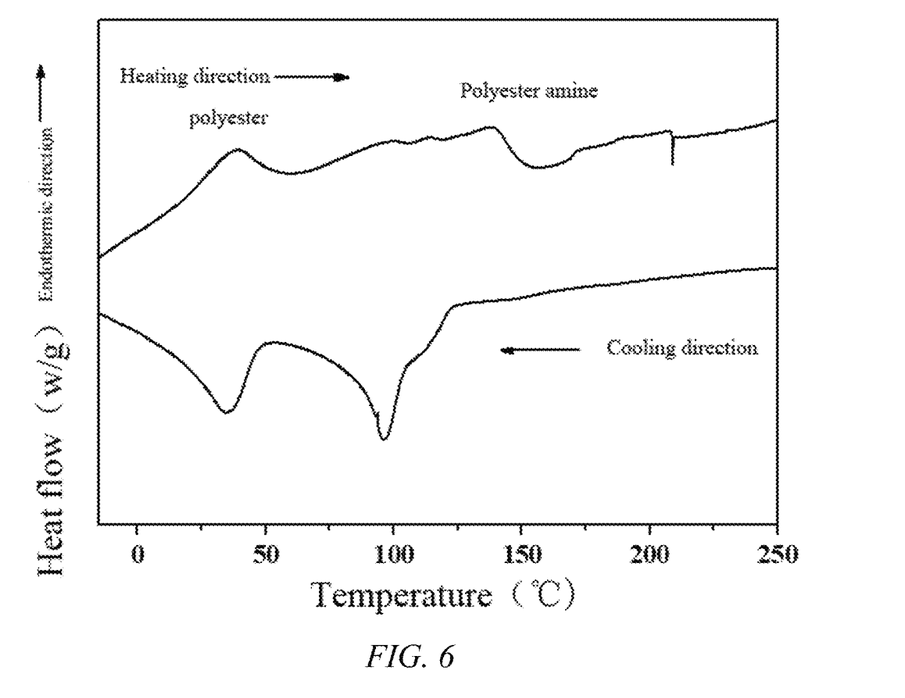
FIG. 6 is shown the differential scanning calorimetry curve of PEBOA-3 in Example 4(heating rate: 10° C. per minute, atmosphere: nitrogen)

The differential scanning calorimetry curve of PEBOA-3 is shown in FIG. 6. It shows that the polymer has two melting points. The one around 36° C. is assigned to the melting point of PEB part of the poly(ester amide), and the other around 137° C. to poly(octamethylene brassylamide) (nylon 6,13) polyamide part, indicating that the polymer of the present invention has a higher melting point and proving the successful synthesis of the target product.

Example 5

Aliphatic poly(ester amide) (PEBOA-4) by cascade polycondensation-coupling ring-opening polymerization of 1,8-octanediamine and ethylene brassylate under vacuum conditions.

1,8-Octanediamine (9.00 g), ethylene brassylate (21.0 g) and n-butyl titanate (60.0 µl) were added into a 250 ml single-necked flask. The mixture was heated to 240° C. under mechanical stirring, and polymerized under vacuum for 60 minutes to finally generate the corresponding polymer PEBOA-4.

The viscosity of the PEBOA-4 measured is 0.77 dL/g in the mixture solvent (phenol and tetrachloroethane with a mass ratio of 3:2) at 25° C.

Example 6

Semi-aromatic poly(ester amide) poly(butylene terephthalate-co-1,8-octamethylene terephthalamide) (PBTOA) by cascade polycondensation-coupling ring-opening polymerization of 1,8-octanediamine and cyclic oligo(butylene terephthalate)s (COBTs) under vacuum conditions.

1,8-Octanediamine (4.00 g), COBTs (36.0 g) and n-butyl titanate (80.0 µl) were added into a 250 ml single-necked flask. The flask was heated to 270° C. with mechanical stirring. The polymerization was carried under vacuum for 60 minutes to finally generate the corresponding polymer PBTOA.

The viscosity of the PBTOA measured is 0.94 dL/g in the mixture solvent (phenol and tetrachloroethane with a mass ratio of 3:2) at 25° C., which proved the successful synthesis of the target product.

Example 7

Aliphatic poly(ester amide) poly(ethylene brassylate-co-1,10-decamethylene brassylamide) (PEBDA) by cascade polycondensation-coupling ring-opening polymerization of 1,10-decanediamine and ethylene brassylate under vacuum conditions.

Figure 7:
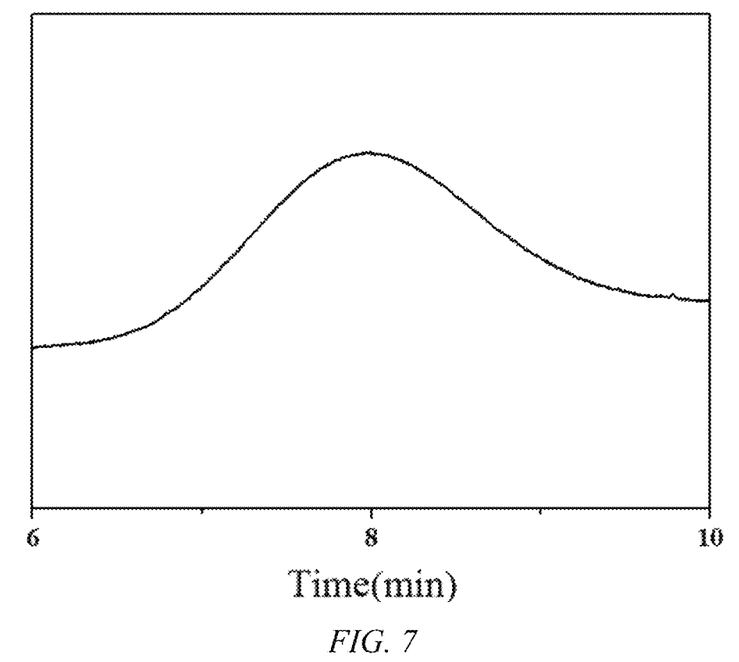
FIG. 7 is shown the size exclusion chromatography curve for PEBDA in Example 7(solvent:tetrahydrofuran concentration: 1.00 mg/ml)

1,10-Decanediamine (1.00 g), ethylene brassylate (9.00 g) and n-butyl titanate (20.0 μl) were added into a 250 ml single-necked flask. The mixture was heated to 240° C. under mechanical stirring, and polymerized under vacuum for 60 minutes to finally generate the corresponding polymer PEBDA. The size exclusion chromatography curve for PEBDA is shown in FIG. 7, and the measured number-average molecular weight is 39.2 kg/mol, which proved the successful synthesis of the target product.

Example 8

Aliphatic poly(ester amide) poly(ethylene brassylate-co-1,12-dodecamethylene brassylamide) (PEBDDA) by cascade polycondensation-coupling ring-opening polymerization of 1,12-diaminododecane and ethylene brassylate under vacuum conditions.

Figure 8:
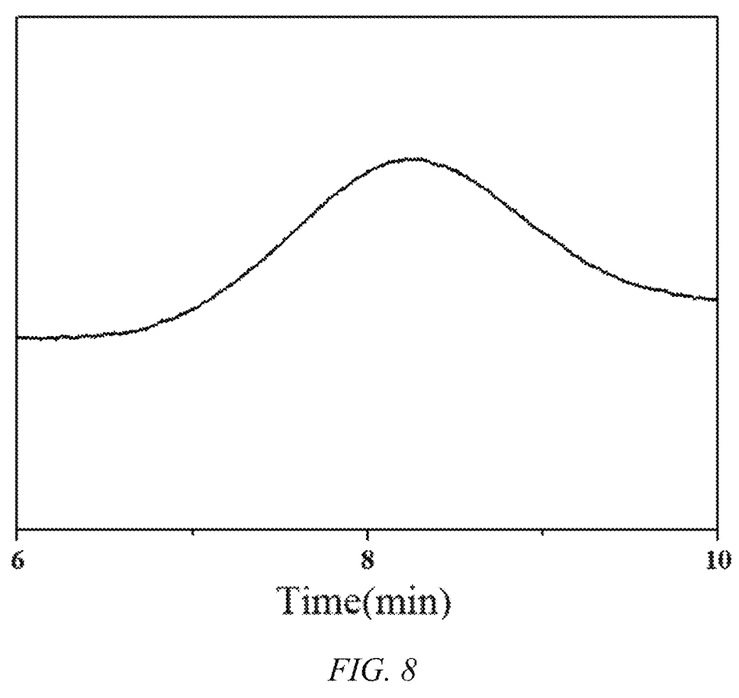
FIG. 8 is shown the size exclusion chromatography curve for PEBDDA in Example 8(solvent:tetrahydrofuran concentration: 1.00 mg/ml)

1,12-Diaminododecane (1.00 g), ethylene brassylate (9.00 g) and n-butyl titanate (20.0 μl) were added into a 250 ml single-necked flask. The flask was heated to 240° C. with mechanical stirring, and polymerized under vacuum for 60 minutes to finally generate the corresponding polymer PEBDDA. The size exclusion chromatography curve for PEBDDA is shown in FIG. 8, and the measured number-average molecular weight is 25.9 kg/mol, which proved the successful synthesis of the target product.

Example 9

Aliphatic poly(ester amide) poly(ethylene adipate-co-1,6-hexamethylene adipamide) (PEAHA) by cascade polycondensation-coupling ring-opening polymerization of 1,6-hexanediamine and cyclic oligo(ethylene adipate).

Figure 9:
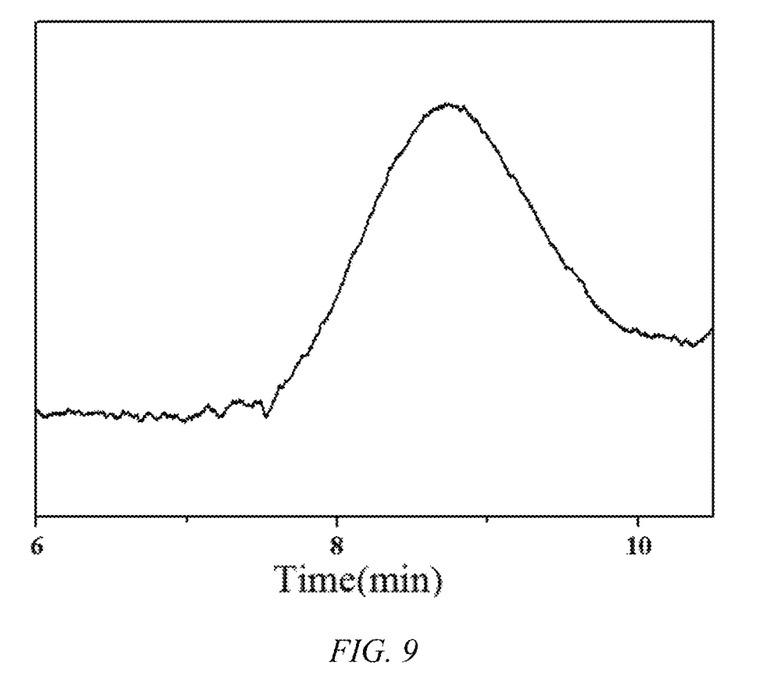
FIG. 9 is shown the size exclusion chromatography curve for PEAHA in Example 9(solvent:tetrahydrofuran concentration: 1.00 mg/ml)

1,6-Hexanediamine (0.10 g) and cyclic oligomer(ethylene adipate)s (1.90 g) were added into a 100 ml three-necked flask with nitrogen inlet. The flask was heated to 220° C. with mechanical stirring, and n-butyl titanate (4.0 μL) was added. The polymerization was carried out under nitrogen for 150 minutes to generate the corresponding polymer PEAHA. The size exclusion chromatography curve for PEAHA is shown in FIG. 9, and the measured number-average molecular weight is 12.1 kg/mol, which proved the successful synthesis of the target product.

Example 10

Aliphatic poly(ester amide) poly(ethylene brassylate-co-1,3-cyclohexanebismethylene brassylamide) (PEBCHA) by cascade polycondensation-coupling ring-opening polymerization of 1,3-cyclohexanebis(methylamine) and ethylene brassylate under nitrogen condition.

Figure 10:
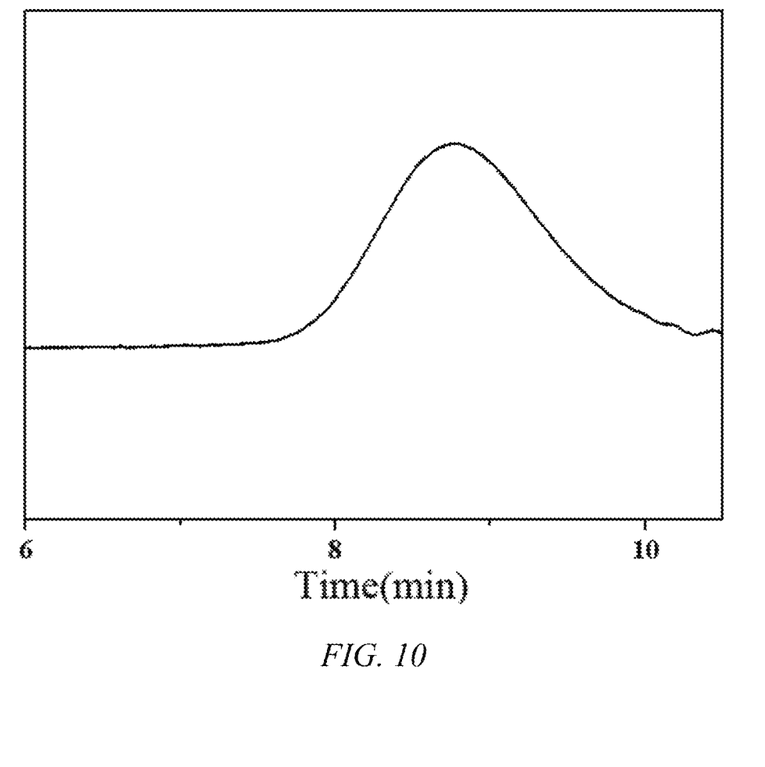
FIG. 10 is shown the size exclusion chromatography curve for PEBCHA in Example 10(solvent:tetrahydrofuran concentration: 1.00 mg/ml)

1,3-Cyclohexanebis(methylamine) (0.50 g) and ethylene brassylate (9.50 g) were added into a 100 ml three-necked flask with nitrogen inlet. The flask was heated to 220° C. with mechanical stirring, and n-butyl titanate (20.0 μL) was added. The polymerization was carried out under nitrogen for 60 minutes to generate the corresponding polymer PEBCHA. The size exclusion chromatography curve for PEBCHA is shown in FIG. 10, and the measured number-average molecular weight is 9.53 kg/mol, which proved the successful synthesis of the target product.

Example 11

Semi-aromatic poly(ester amide) poly(ethylene brassylate-co-1,4-xylylene brassylamide) (PEBXA) by cascade polycondensation-coupling ring-opening polymerization of 1,4-xylylenediamine and ethylene brassylate under nitrogen condition.

Figure 11:
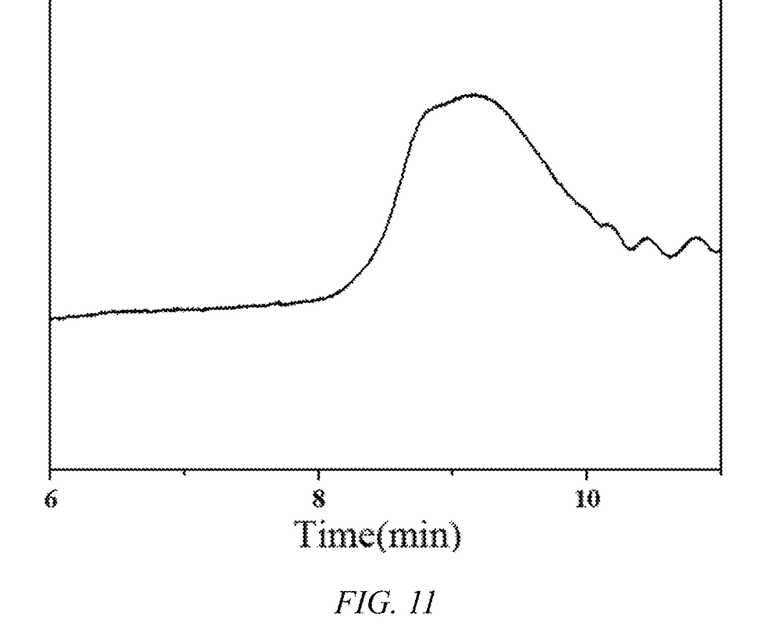
FIG. 11 is shown the size exclusion chromatography curve for PEBXA in Example 11(solvent:tetrahydrofuran concentration: 1.00 mg/ml)

1,4-xylylenediamine (0.50 g) and ethylene brassylate (9.50 g) were added into a 100 ml three-necked flask with nitrogen inlet. The flask was heated to 220° C. with mechanical stirring, and n-butyl titanate (20.0 μL) was added. The polymerization was carried out under nitrogen for 60 minutes to generate the corresponding polymer PEBXA. The size exclusion chromatography curve for PEBXA is shown in FIG. 11, and the measured number-average molecular weight is 6.03 kg/mol, which proved the successful synthesis of the target product.

Example 12

Aliphatic poly(ester amide) (PEBAHA) by cascade polycondensation-coupling ring-opening polymerization of 6-amino-1-hexanol and ethylene brassylate under nitrogen condition.

Figure 12:
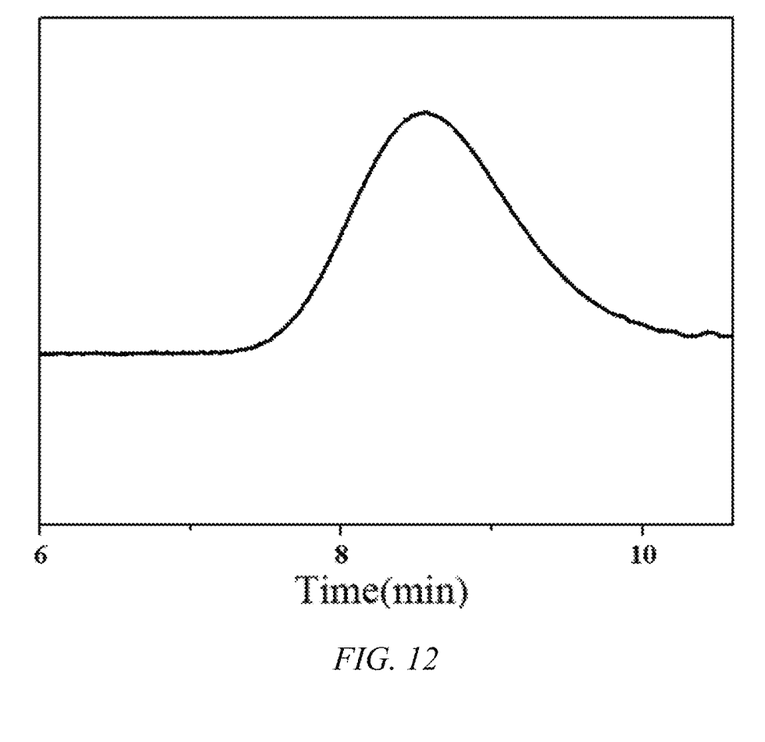
FIG. 12 is shown the size exclusion chromatography curve for PEBAHA in Example 12(solvent:tetrahydrofuran concentration: 1.00 mg/ml)

6-Amino-1-hexanol (0.50 g) and ethylene brassylate (9.50 g) were added into a 100 mL three-necked flask with nitrogen inlet. The flask was heated to 220° C. with mechanical stirring, and n-butyl titanate (20.0 μL) was added. The polymerization was carried out under nitrogen for 60 minutes to generate the corresponding polymer PEBAHA. The size exclusion chromatography curve for PEBAHA is shown in FIG. 12, and the measured number-average molecular weight is 13.7 kg/mol, which proved the successful synthesis of the target product.

Figure 13:
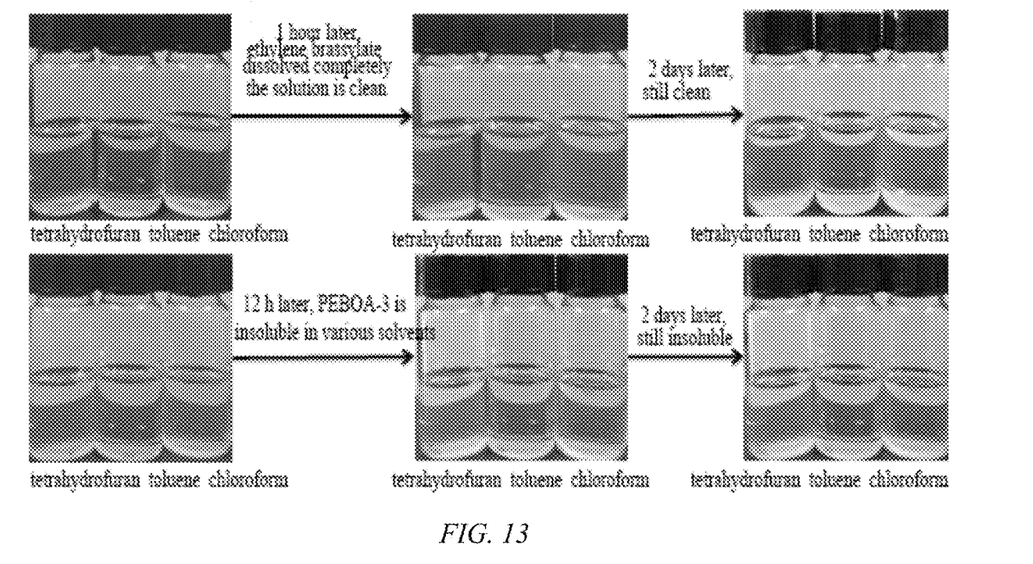
FIG. 13 is shown a comparison chart of the solubility of aliphatic polyesters and poly(ester amide)s.

As shown in FIG. 13, the poly(ester amide) obtained by the present invention (Example 4, PEBOA-4) is insoluble in common organic solvents such as tetrahydrofuran, toluene, chloroform, etc., while the corresponding aliphatic polyester PEB is soluble in these solvents (1 mg/mL), indicating that poly(ester amide)s have good solvent resistance.

Example 13

Aliphatic poly(ester amide) (PEBDA-2) by cascade polycondensation-coupling ring-opening polymerization of 1,10-decanediamine and ethylene brassylate under vacuum conditions.

Figure 14:
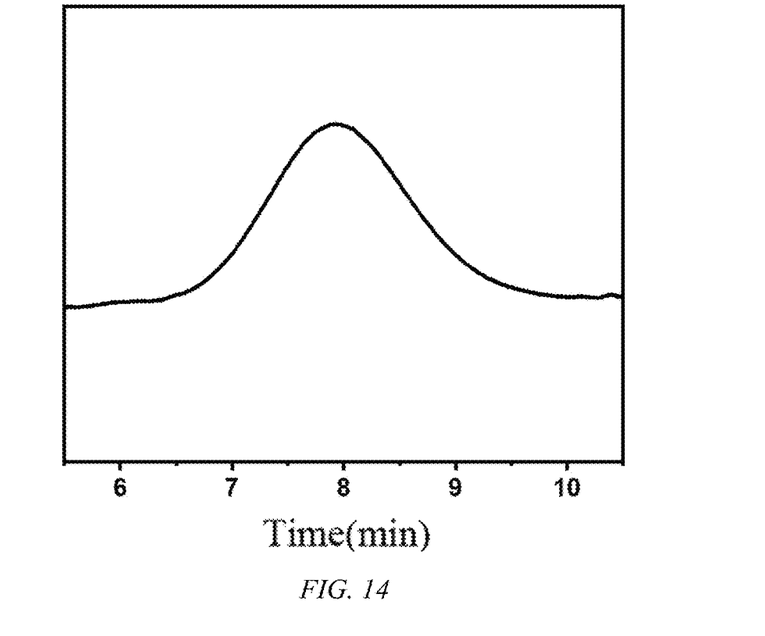
FIG. 14 is shown the size exclusion chromatography curve for PEBDA-2 in Example 13(solvent:tetrahydrofuran concentration: 1.00 mg/ml)

1,10-decanediamine (1.50 g), ethylene brassylate (28.5 g) and n-butyl titanate (60.0 μl) were added into a 250 ml single-necked flask. The mixture was heated to 240° C. under mechanical stirring, and polymerized under vacuum for 60 minutes to finally generate the corresponding polymer PEBDA-2. The size exclusion chromatography curve for PEBDA-2 is shown in FIG. 14, and the measured number-average molecular weight is 30.0 kg/mol, which proved the successful synthesis of the target product.

Example 14

Degradation test of PEBDA-2 at 37° C. in phosphate buffered saline solution.

The pH of the phosphate buffered saline solution is from 7.2 to 7.4, the ingredients include 80.0 g/L of sodium chloride, 2.00 g/L of potassium chloride, 36.3 g/L of disodium hydrogen phosphate dodecahydrate, 2.40 g/L g/L of potassium dihydrogen phosphate; Phosphate buffered salt solution is divided into lipase-free group and lipase-containing group (lipase name: Pseudomonas cepacia lipase, enzyme activity: $30.0 \times 10^3$ units per gram, optimal pH value: 7.0).

Figure 15:
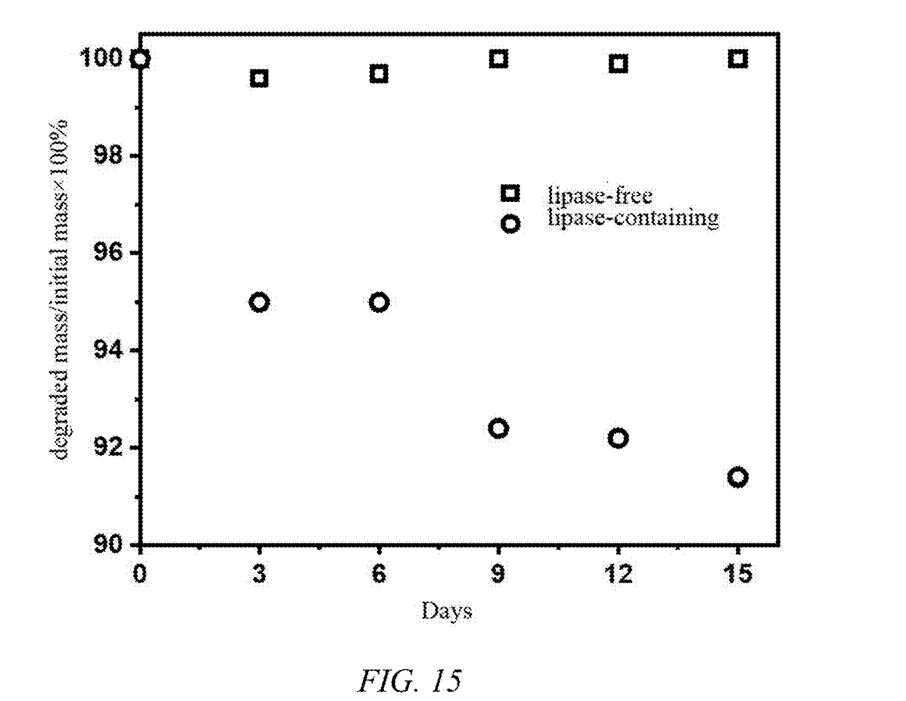
FIG. 15 is shown the degradation curves which the quality at 37° C. of PEBDA-2 in lipase-free and lipase-containing phosphate buffered saline solutions over time.
Figure 16:
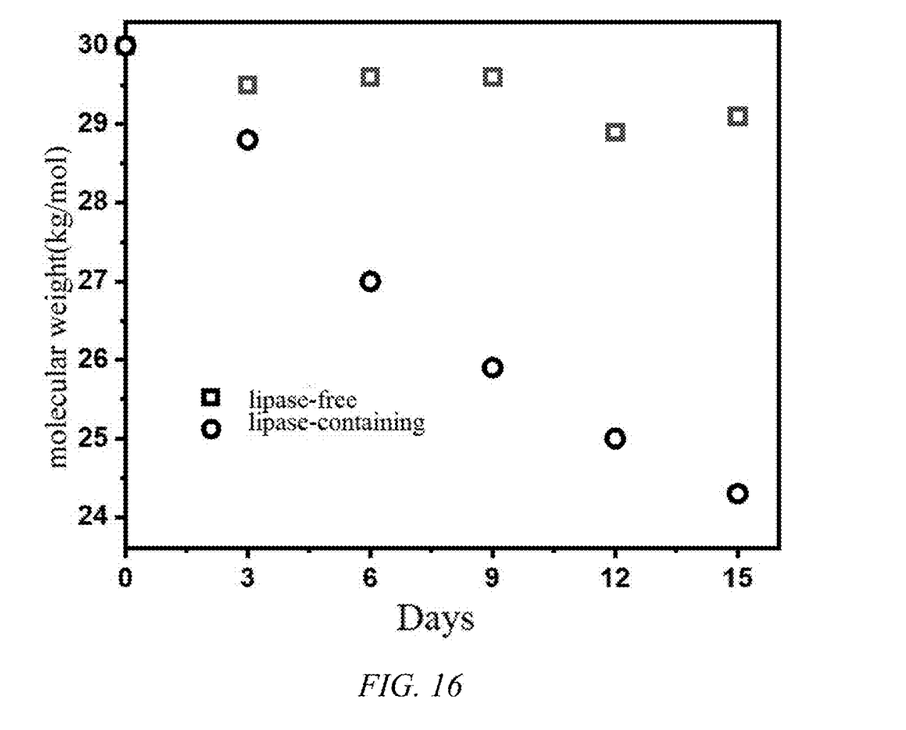
FIG. 16 is shown the degradation curves which the molecular weight at 37° C. of PEBDA-2 in lipase-free and lipase-containing phosphate buffered saline solutions over time.

Immersed the sample of PEBDA-2(prepared in Example 13, the initial molecular weight of the sample is 30.0 kg/mol) with 10.0 mg of the mass and the disc shape (the diameter is about 5.00 mm) into the 1.00 mg of phosphate buffered salt solution containing lipase (concentration: 1.00 mg/ml), The sample was placed at 37° C. for degradation test. Another set of control experiments were set up in lipase-free group phosphate buffered saline solution and other conditions were unchanged. When it reached the predetermined number of days, took out the sample, rinsed with distilled water, filtered, and dried, measured with an electronic balance and tested molecular weight with gel permeation chromatography. The degradation curves which the mass at 37° C. of PEBDA-2 in lipase-free and lipase-containing phosphate buffered saline solutions over time is shown in FIG. 15. It can be seen from the figure that the (PEBDA-2) at 37° C. in lipase-free phosphate buffered saline solution, the mass was no reduction. However, the mass become lower and lower in lipase-containing phosphate buffered saline solution, and the surplus mass after degradation for 5 days is about 91.4% (degraded mass/initial mass×100%). The degradation curves which the molecular weight at 37° C. of PEBDA-2 in lipase-free and lipase-containing phosphate buffered saline solutions over time is shown in FIG. 16. The degradation rate was very slow in lipase-free and lipase-containing phosphate buffered saline solution, and the molecular weight decreases slightly. The speed of degradation was faster in lipase-containing phosphate buffered saline solution, the molecular weight was from 30.0 kg/mol to 24.3 kg/mol within 5 days. It shows that the aliphatic copolyester $(PEB-b-PEO-b-PPO-b-PEO-b-PEB)_n$ has good degradability.

The foregoing descriptions are only preferred embodiments of the invention and are not intended to limit the invention. For those skilled in the art, the invention can have various modifications and changes. Any modification, equivalent replacement, improvement, etc. made within the spirit and principle of the present invention should be included in the protection scope of the present invention.

The invention claimed is:

1. A method of preparing poly(ester amide)s of the following chemical formula:

$$HO{-}(CH_2)_t{-}O{-}[{-}C(=O){-}R_2{-}C(=O){-}O{-}(CH_2)_t{-}O{-}]_x{-}[{-}C(=O){-}R_2{-}C(=O){-}NH{-}R_1{-}]_y{-}H$$

$R_1$ is $-(CH_2)_nNH-$, $-(CH_2)_6O-$, or $-C(CH_3)_2CH_2O-$;

or $R_1$ is $-CH_2-$(cyclohexane)$-CH_2NH-$, or $-CH_2-$(phenyl)$-CH_2NH-$;

$R_2$ is $-(CH_2)_m$ or $-$(phenyl)$-$;

n is from 4 to 16; m is from 4 to 11; t is from 2 to 4; x is from 10 to 250; y is from 2 to 200, comprising: with diamines or aminoalcohols as initiators, diacid and dialcohol-based cyclicesters as monomers, in the presence of a catalyst, reacting the diacid and the dialcohol-based cyclicesters to prepare the poly(ester amide) s by cascade polycondensation-coupling ring-opening polymerization, wherein the catalyst is n-butyl titanate; and wherein the reaction is conducted under the nitrogen atmosphere or vacuum condition; after the reaction, the poly(ester amide) s is directly obtained without post-treatment.

2. The method according to claim 1, wherein the diamine is 1,6-hexanediamine, 1,8-octanediamine, 1,10-decanediamine, 1,12-diaminododec-ane, 1,3-cyclohexanedimethylamine, or 1,4-xylylenediamine; the aminoalcohol is 6-amino-1-hexanol or isobutanolamine; the diacid and dialcohol-based cyclicesters are cyclic oligoesters or aromatic macrolide.

3. The method according to claim 1, wherein the reaction is conducted at 200 to 280° C.

4. The method according to claim 1, wherein a molar ratio of the catalyst is 0.03% to 1% of the total mass of monomer and initiator.

* * * * *